United States Patent
Honhoff

(10) Patent No.: US 7,946,814 B2
(45) Date of Patent: May 24, 2011

(54) WIND TURBINE BLADE CLEANING METHOD

(75) Inventor: Saskia Gerarda Honhoff, Salzbergen (DE)

(73) Assignee: General Electric Company, Schenectady, NY (US)

( * ) Notice: Subject to any disclaimer, the term of this patent is extended or adjusted under 35 U.S.C. 154(b) by 253 days.

(21) Appl. No.: 12/201,501

(22) Filed: Aug. 29, 2008

(65) Prior Publication Data

US 2010/0054940 A1 Mar. 4, 2010

(51) Int. Cl.
*F03D 7/04* (2006.01)
(52) U.S. Cl. ............... 416/1; 416/31; 416/37; 416/61
(58) Field of Classification Search ............ 416/1, 61, 416/31, 36, 37, 39; 415/1, 13, 17, 47, 48, 415/118; 290/44, 55; 134/18, 32–34, 37, 134/113, 116
See application file for complete search history.

(56) References Cited

U.S. PATENT DOCUMENTS

| 6,890,152 | B1 | 5/2005 | Thisted |
| 7,086,834 | B2 | 8/2006 | LeMieux |
| 2008/0001409 | A1 | 1/2008 | Schellings |
| 2008/0112807 | A1* | 5/2008 | Uphues et al. ............ 416/1 |

FOREIGN PATENT DOCUMENTS

EP 1517033 A1 3/2005

\* cited by examiner

*Primary Examiner* — Christopher Verdier
(74) *Attorney, Agent, or Firm* — McNees Wallace & Nurick LLC

(57) ABSTRACT

A method for cleaning the blades of a wind turbine using precipitation. The method includes determining the presence or absence of precipitation. In response to the determination of the presence of precipitation, adjusting the rotor speed to increase the speed of the blades and/or adjusting the variable pitch drive to increase the pitch of the blades. The combination of the increased blade speed and/or the increase blade pitch and the presence of precipitation facilitate the removal of debris from the blades by the precipitation.

18 Claims, 4 Drawing Sheets

WIND TURBINE BLADE CLEANING METHOD

FIELD

The present invention is directed generally to wind turbines, and more particularly to a method for cleaning the blades of a wind turbine.

BACKGROUND

Recently, wind turbines have received increased attention as environmentally safe and relatively inexpensive alternative energy sources. With this growing interest, considerable efforts have been made to develop wind turbines that are reliable and efficient.

Generally, a wind turbine includes a rotor having multiple blades. The rotor is mounted to a housing or nacelle, which is positioned on top of a truss or tubular tower. Utility grade wind turbines (i.e., wind turbines designed to provide electrical power to a utility grid) can have large rotors (e.g., 30 or more meters in length). In addition, the wind turbines are typically mounted on towers that are at least 60 meters in height. Blades on these rotors transform wind energy into a rotational torque or force that drives one or more generators that may be rotationally coupled to the rotor through a gearbox. The gearbox steps up the inherently low rotational speed of the turbine rotor for the generator to efficiently convert mechanical energy to electrical energy, which is fed into a utility grid.

Wind turbine blades have continually increased in size in order to increase energy capture. It is important to optimize the operation of the wind turbine, including blade energy capture, to reduce the cost of the energy produced. Pitch setting of the blades (i.e., the angle of attack of the airfoil shaped blade), provides one of the parameters utilized in wind turbine control. Typically, controllers are configured to adjust rotor speed (i.e., the rotational speed of the hub around which the blades rotate) and/or power output by adjusting the blade pitch or generator torque in a manner that provides increased or decreased energy transfer from the wind, which accordingly is expected to adjust the rotor speed.

Wind turbines with sophisticated control systems maintain constant tip ratio speed (at low wind speed) or power (at high wind speed) by active torque and blade pitch control. Power production for a wind turbine is negatively impacted if the blades of the wind turbine operate in a non-optimal state. A common problem that causes sub-optimal performance of the machine is blade fouling. Blade fouling may result from a variety of sources. For example, insects, dirt or other debris may accumulate on the leading edge or other surfaces of the turbine blades. The buildup of debris may possibly reduce the efficiency of energy transfer from the wind and may possibly in certain circumstances ultimately result in an aerodynamic stall from separation in airflow over the surface of the wing, and loss of efficiencies. To combat the problem of blade fouling, regular maintenance, including removal and cleaning of the blades, has been required. In addition, certain attempts to combat blade fouling have included complicated and expensive equipment arranged to clean the blades in place.

Therefore, what is needed is a method for cleaning fouled wind turbine blades that does not require expensive and complicated equipment, and does not require removal of the blade or complete shutdown of the wind turbine.

SUMMARY

The disclosure is directed to a wind turbine that senses precipitation and adjusts the speed and pitch of the blades accordingly. The disclosure is also directed to a method of cleaning the blades of the wind turbine to remove any debris which can accumulate thereon.

The wind turbine has one or more blades that rotate about a rotor, the speed of which can be adjusted. At least one sensor that can detect the presence or absence of precipitation is provided in communication with the wind turbine. A controller is configured to adjust the rotor speed in response to a signal from the at least one sensor corresponding to the presence or absence of precipitation. The at least one sensor and the controller cooperate to increase the rotor speed during the presence of precipitation, thereby allowing the precipitation to remove the debris from the blades of the wind turbine.

The controller may also be configured to adjust pitch of the blades in response to a signal from the at least one sensor corresponding to the presence or absence of rain. The at least one sensor and the controller cooperate to increase the pitch of the blades during the presence of precipitation, thereby allowing the precipitation to cooperate with a larger surface area of the blades to remove the debris from the blades of the wind turbine.

The controller may have a control system which can receive input from the at least one sensor configured to detect the presence or absence of precipitation and other sensors which detect other environmental conditions. The control system processes all of the input and may direct the controller to adjust rotor speed or increase the pitch of the blades in response to the signal from at least one sensor corresponding to the presence or absence of precipitation and signals from the other sensors corresponding to the other environmental conditions.

The method for cleaning the blades of a wind turbine with an adjustable speed rotor includes determining the presence or absence of precipitation. In response to the determination of the presence of precipitation, the rotor speed is adjusted to increase the speed of the blades. The combination of the increased rotor speed and the presence of precipitation facilitate the removal of debris from the blades by the precipitation.

The method for cleaning the blades of a wind turbine which rotate about a rotor, the wind turbine having a variable pitch drive to control the pitch of the blades, includes determining the presence or absence of precipitation. In response to the determination of the presence of precipitation, variable pitch drive is engaged to change the pitch of the blades. The combination of the variable pitch of the blades and the presence of precipitation facilitates the removal of debris from the blades by the precipitation over a large surface area.

The method may also include having a control system, such that upon determination of precipitation, prior to adjusting the rotor speed, the control system analyzes stored data or input received from the various input devices to determine if the rotor speed is to be adjusted and/or if the pitch of the blades is to be adjusted. In addition, after the rotor speed has been adjusted and/or after the pitch of the blades has been adjusted, the control system analyzes the precipitation data and stored data or input received from the various input devices to determine if the rotor speed is to be further adjusted and/or if the pitch of the blades is to be further adjusted.

Other features and advantages of the present disclosure will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 1:
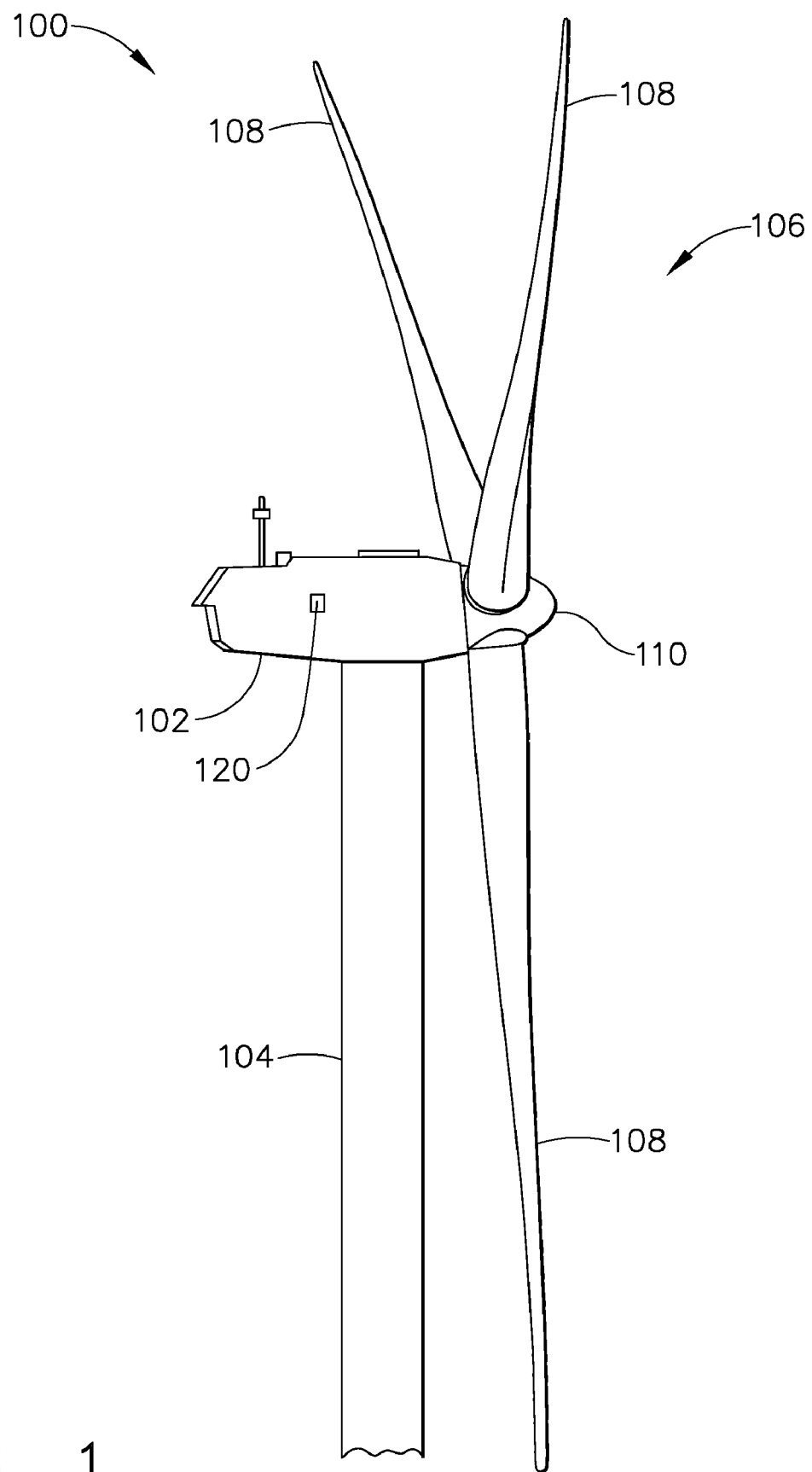
FIG. 1 is an illustration of an exemplary configuration of a wind turbine.

Referring to FIG. 1, an exemplary wind turbine 100 is disclosed. The wind turbine 100 includes a nacelle 102 mounted atop a tall tower 104, only a portion of which is shown in FIG. 1. Wind turbine 100 also comprises a wind turbine rotor 106 that includes one or more rotor blades 108 attached to a rotating hub 110. In the embodiment shown, a precipitation or rain sensor 120 is positioned on the nacelle 102, although other configurations are possible, such as near the turbine close to ground level or on a nearby meteorological mast. Although wind turbine 100 illustrated in FIG. 1 includes three rotor blades 108, there are no specific limits on the number of rotor blades 108 that can be used. The height of tower 104 is selected based upon factors and conditions known in the art.

Figure 2:
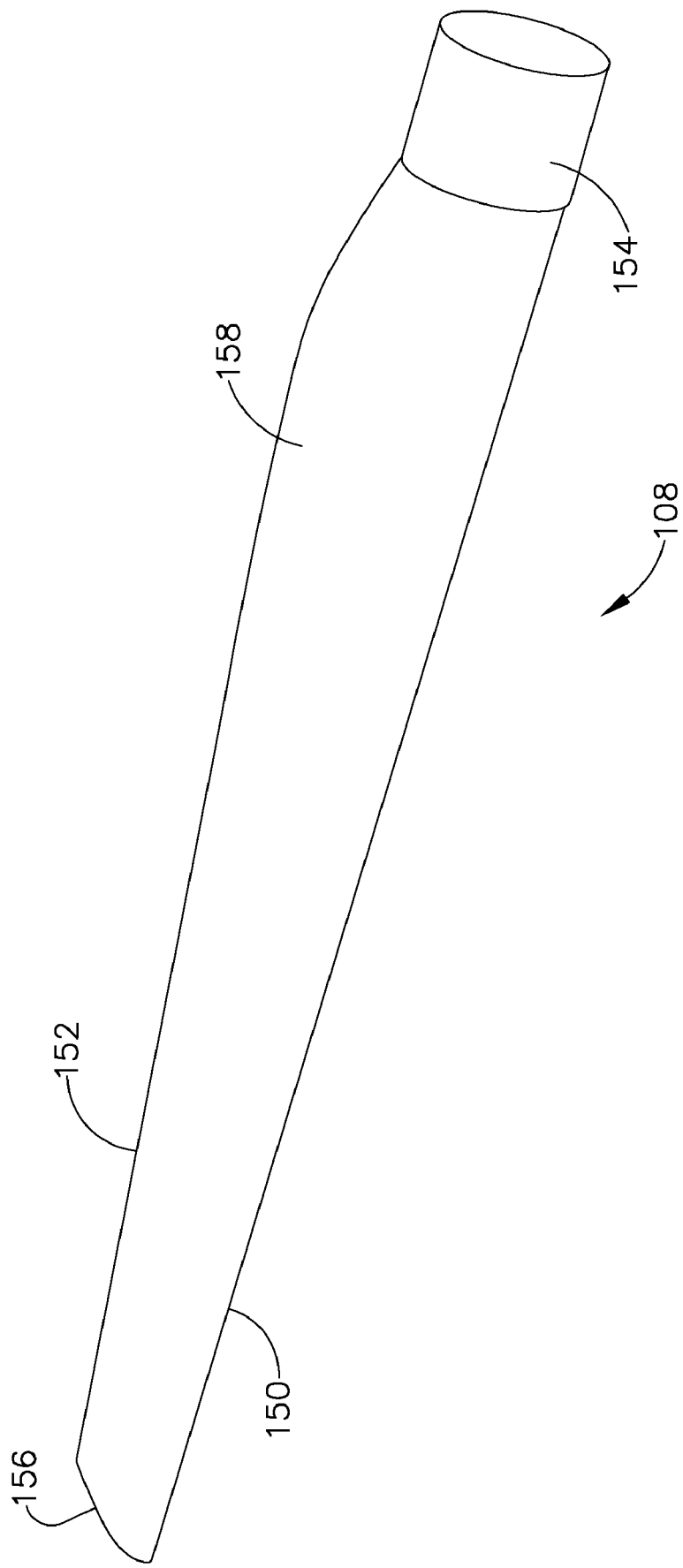
FIG. 2 is an illustration of a blade of the exemplary wind turbine configuration shown in FIG. 1.

As shown in FIG. 2, each rotor blade 108 has a leading edge 150, a trailing edge 152, a fixed end 154 and a free end 156. Side surfaces 158 are configured to provide sufficient surface area, such that the wind will cooperate with the side surfaces 158 to turn the blades 108. The configuration of the blades is merely exemplary, as other known blade configurations can be used.

Figure 3:
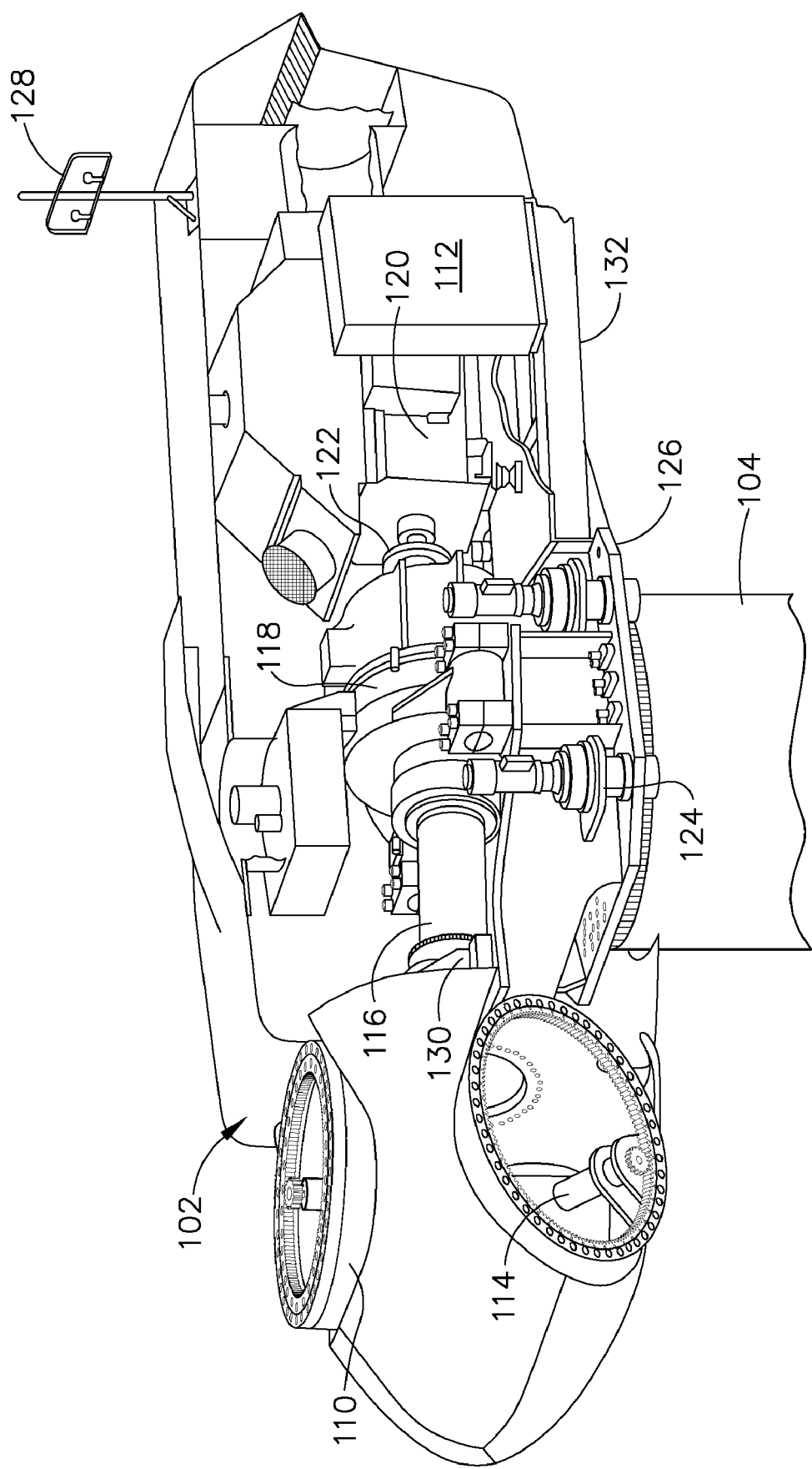
FIG. 3 is a cut-away perspective view of a nacelle of the exemplary wind turbine configuration shown in FIG. 1.

In some configurations and referring to FIG. 3, various components are housed in nacelle 102 atop tower 104. One or more microcontrollers or other control components (not shown) are housed within controller or control panel 112. The microcontrollers include hardware and software configured to provide a control system providing overall system monitoring and control, including pitch and speed regulation, high-speed shaft and yaw brake application, yaw and pump motor application and fault monitoring. In alternative embodiments of the disclosure, the control system may be a distributed control architecture not solely provided for by the control panel 112 as would be appreciated by one of ordinary skill in the art. The control system provides control signals to a variable blade pitch drive 114 to control the pitch of blades 108 (FIG. 1) that drive hub 110 as a result of wind. In some configurations, the pitches of blades 108 are individually controlled by blade pitch drive 114.

The drive train of the wind turbine includes a main rotor shaft 116 (also referred to as a "low speed shaft") connected to hub 110 and supported by a main bearing 130 and, at an opposite end of shaft 116, to a gear box 118. The speed of rotation of the main rotor shaft 116 or rotor speed may be measured by suitable instrumentation or measurement devices (not shown). In some configurations, hub rotational speed is known from an encoder on a high speed shaft connected to the aft end of the generator; and blade length, which is known, is used to determine tip speed. In addition, the rotor speed may be determined from a proximity switch on the high or low speed shaft. In addition, the rotor speed may be directly measured with sensing devices, such as optical strobing detection of a labeled high or low speed shaft. The rotor speed information may be provided to the control system to provide inputs for determination of a tip speed ratio. Gear box 118, in some configurations, utilizes a dual path geometry to drive an enclosed high speed shaft. The high speed shaft (not shown in FIG. 2) is used to drive generator 120, which is mounted on main frame 132. In some configurations, rotor torque is transmitted via coupling 122. Generator 120 may be of any suitable type: for example, a wound rotor induction generator.

Yaw drive 124 and yaw deck 126 provide a yaw orientation system for wind turbine 100. Anemometry provides information for the yaw orientation system, including measured instantaneous wind direction and wind speed at the wind turbine. Anemometry may be provided by a wind vane 128. The anemometry information may be provided to the control system to provide inputs for determination of a tip speed ratio. In some configurations, the yaw system is mounted on a flange provided atop tower 104.

Figure 4:
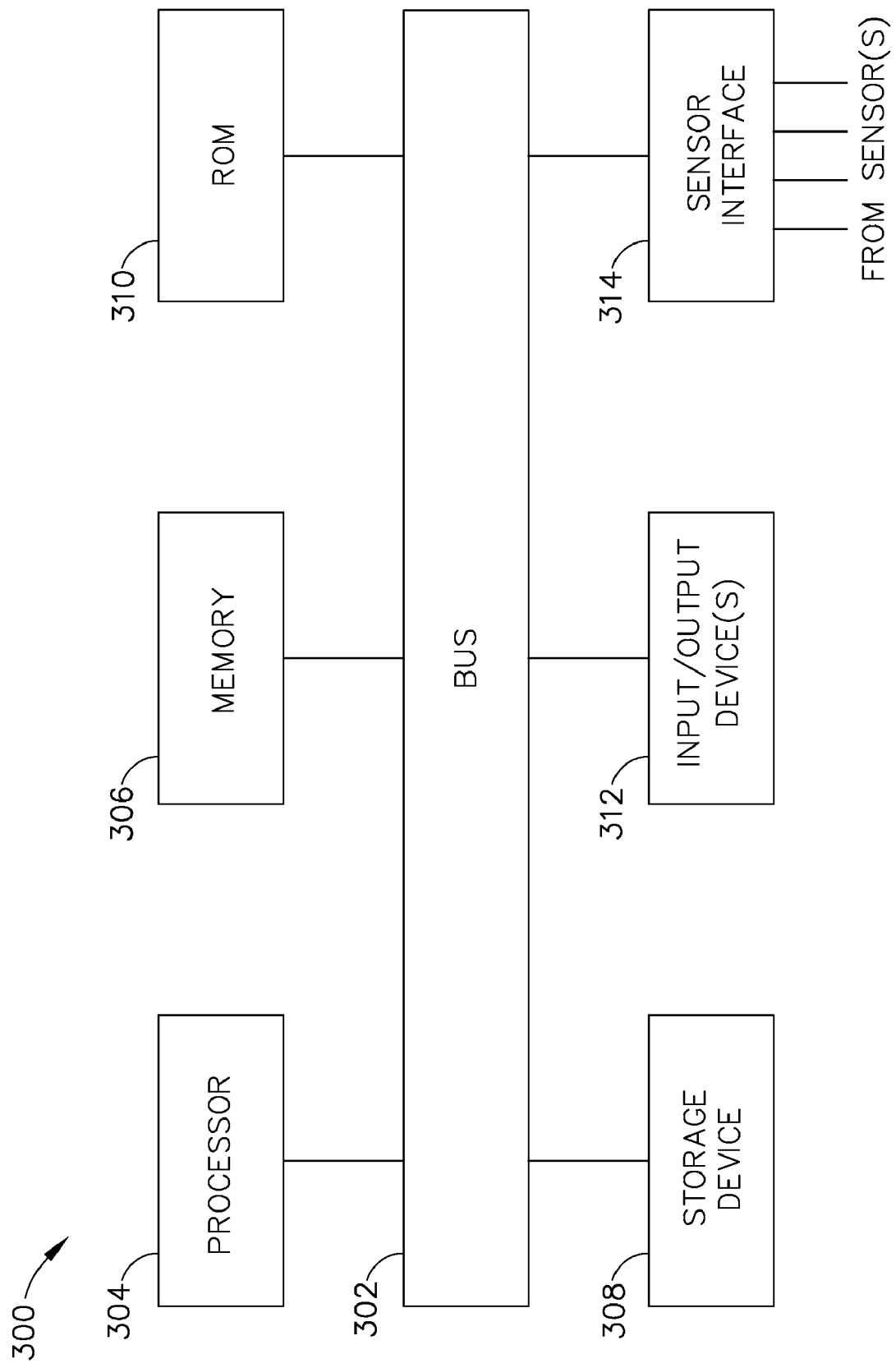
FIG. 4 is a block diagram of an exemplary configuration of a control system for the wind turbine configuration shown in FIG. 1.

In some configurations and referring to FIG. 4, an exemplary control system 300 for wind turbine 100 includes a bus 302 or other communications device to communicate information. Processor(s) 304 are coupled to bus 302 to process information, including information from sensors configured to measure displacements or moments. Control system 300 further includes random access memory (RAM) 306 and/or other storage device(s) 308. RAM 306 and storage device(s) 308 are coupled to bus 302 to store and transfer information and instructions to be executed by processor(s) 305. RAM 306 (and also storage device(s) 308, if required) can also be used to store temporary variables or other intermediate information during execution of instructions by processor(s) 305. Control system 300 can also include read only memory (ROM) and or other static storage device 310, which is coupled to bus 302 to store and provide static (i.e., non-changing) information and instructions to processor(s) 304. Input/output device(s) 312 can include any device known in the art to provide input data to control system 300 and to provide yaw control and pitch control outputs. Instructions are provided to memory from a storage device, such as magnetic disk, a read-only memory (ROM) integrated circuit, CD-ROM, DVD, via a remote connection that is either wired or wireless providing access to one or more electronically-accessible media, etc. In some embodiments, hard-wired circuitry can be used in place of or in combination with software instructions. Thus, execution of sequences of instructions is not limited to any specific combination of hardware circuitry and software instructions. Sensor interface 314 is an interface that allows control system 300 to communicate with one or more sensors. Sensor interface 314 can be or can comprise, for example, one or more analog-to-digital converters that convert analog signals into digital signals that can be used by processor(s) 304. In one embodiment, the sensor interface includes signals from a rotor speed determining device and anemometry from wind vane 128.

The use of these types of control systems 300 allows the wind turbines 100 to maintain an optimal constant speed and optimal energy capture by active blade pitch control using pitch motors (not shown). However, energy capture for the wind turbines 100 is negatively impacted if the blades 108 of the wind turbines operate in a non-optimal state. The present disclosure attempts to facilitate maximal energy capture by removing insects, dirt and/or other debris which may accumulate on the blades 108, and in particular on the leading edge 150 of the blades 108, without the need to stop the rotation of the blades 108, thereby minimizing the effects of blade fouling and reducing the amount of time for which the wind turbines 100 must be taken off line for maintenance.

Referring to FIG. 1, the rain sensor 120 is mounted to the nacelle 102. In the alternative, the rain sensor 120 can be mounted in any other position on the wind turbine. For a wind park, having many wind turbines 100, a single rain sensor 120 may be provided for an entire wind park. The single rain sensor can be positioned on a respective wind turbine 100 or in any other location within or proximate the wind park. While many options are available for the positioning of the rain sensor, positioning the rain sensor in the general vicinity of the wind turbine or the wind park allows the rain sensor to accurately measure the precipitation or rain in that area. The rain sensor may be hard wired to the sensor interface 314 of the control system 300 or the rain sensor may be wirelessly connected thereto.

It should be appreciated that the instant configuration may be also made without a rain sensor by detecting one or more changed wide turbine component parameters that would allow one to infer the existence of the rain without directly sensing the rain. Components may include the blades, the gearbox, the shaft, or the temperature or humidity in response to the rain. In response to this changed parameter or operation of the wind turbine, a controller may infer that it is raining and then change operation as discussed herein.

Upon the occurrence of rain, the rain sensor senses the precipitation and sends a signal to the control system 300 via the sensor interface 314. The information is sent via the bus 302 to the processor 304 which processes the information and sends instructions via the output device 312 to the control panel 112. The control panel in turn provides signals to increase the speed of the rotor shaft 116, thereby increasing the speed of the blades 108. The increased speed of the blades 108 increases the cleaning power of the rain on the blades. As the rain impacts the blades at a greater speed, and as the rain is channeled across the blades at a greater speed, the rain is able to remove more insects, dirt and other debris than if the speed of the blades was not increased. This is particularly advantageous in cleaning the leading edge 150 and side surface 158 of the blades. In addition, the control panel may send signals to the variable blade pitch drive 114 to adjust the angle of pitch of the blades 108. This changes the inflow angle of the rain and increases the surface area on the side surfaces 158 of the blades 108 on which the rain flows, thereby increasing the area of the side surfaces 158 of the blades that is cleaned. As the leading edges 150 and the side surfaces 158 are where the majority of blade fouling occurs, this is an effective manner to clean the blades 108. It should be appreciated that in an alternative embodiment, a cleaning solution may be released for further cleaning in response to the rain for increased scrubbing.

During a rain event with low wind speed, the speed of the blades 108 may be increased to the maximum speed for normal operation of the wind turbine. During a rain event with high wind speed, the speed of the blades 108 may be temporarily increased beyond the maximum speed for normal operation of the wind turbine. However, the speed of the blades and the pitch may vary depending upon the conditions present and the level of cleaning needed.

During the cleaning process, the energy capture or power output may be reduced, as the speed and pitch of the blades 108 are optimized for cleaning rather than power output. However, the cleaning process is a relatively small percentage of the operating time of the wind turbine 100. Therefore, by optimizing the cleaning, the energy capture or power output is maximized during normal operation, as the optimum aerodynamic properties of the clean blades 108 can be maintained. Preferably, the wind turbine can alternatively detect or infer that the blades are clean and then resume normal operation for power capture.

In order to maximize the energy capture of the wind turbine, the blades need not be cleaned every time it rains. Therefore, the control system 300 may be programmed to initiate the cleaning process only after a set period of time has elapsed since the last cleaning. For this to be effective, the control system must have a timing mechanism either built in or externally connected.

As an example, the wind turbine 100 is located in an area in which, due to the environmental conditions, the blades 108 must be cleaned no more than once a month to maintain optimum power capture. Upon occurrence of rain, the rain sensor 120 sends a signal to the control system 300. In this example, parameters have been entered and stored in the processor 304 that optimal cleaning should occur no more than once a month, or according to any parameter that is desired. The processor 304 receives the signal from the rain sensor and assigns a time thereto. The processor 304 checks the newly assigned time to the time of the last cleaning process. If the difference in time is less than one month, the control system 300 does not adjust the speed or pitch of the blades 108 and no cleaning process is initiated. In contrast, if the difference in time is equal to or greater than one month, a cleaning process is initiated and the speed and/or pitch of the blades 108 are adjusted as appropriate. While this example recites one month, any appropriate time may be selected. The time is generally selected based on the environmental conditions for the area.

Alternatively, the control system 300 may base the need for cleaning on information received from other sensors, rather than time. Sensors which measure the amount of airborne bugs over time or the amount of large particulates in the air over time may be used. These sensors are connected to the control system 300 through the sensor interface 314. Until a predefined level of bugs or particulates is reached, the processor 304 will not initiate the cleaning process even upon the occurrence of rain. After the predefined level is reached, the processor 304 will initiate the cleaning process upon the occurrence of the next rain. It should be appreciated that the processor accesses logic, such that when storm conditions exist, an evaluation of cleaning versus possible damage may be conducted. Similarly, the processor will determine if cleaning should be terminated to properly maintain the safety of the wind turbine.

Sensors which directly monitor the blades 108, i.e. cameras, etc., may also be used. Visual images may be sent to the processor 304 to compare to stored images. When the transmitted images show debris which is greater than the debris shown on the stored images, the processor 304 will initiate the cleaning process upon the occurrence of rain.

While particular sensors are discussed, many sensors can be incorporated into the system to provide more data which the processor 304 can use to provide appropriate cleaning. Sensors or input from weather monitoring systems, weather predicators, wind plant central monitoring/control, etc. can be used to facilitate the cleaning process. These sensors can be located on-site or remotely positioned to provide advance notice of weather conditions. In particular, in environments where rain occurs infrequently, it may be beneficial to use such outside sensors or information to anticipate the occurrence of rain. The control system 300 would use such input to adjust the blades 108 in anticipation of the rain event. By so doing, even a brief rain shower can provide significant cleaning.

During a long or intense rain storm, it may not be necessary to extend the cleaning process for the duration of the storm. Depending upon the length or intensity of the storm, the processor 304, as determined by the information received from the rain sensor 120 and other sensors, may return the blades 108 from their cleaning position to their maximum energy capture position. This occurs when the processor 304 determines that the blades 108 are properly cleaned. In order to make this determination, the processor 304 compares data received from relevant sensors with stored information to determine the appropriate length of the cleaning process.

Additionally, seasonal variations may be programmed into the control system 300. As the amount of debris in the air, the intensity of rain, wind conditions, and other environmental conditions change during the course of a year, the processor 304 can be programmed with precise parameters to reflect these seasonal variations, thereby providing appropriate cleaning of the blades 108 to optimize the energy capture of the wind turbine 100 in changing conditions.

Storage of the precipitation may also prove advantageous. The would allow the rain to be captured and stored and then released at appropriate times to allow for the optimum cleaning of the blades. This may particularly helpful in regions in which the rainfall does not occur uniformly during the course of the year.

By providing a rain sensor 120 and other sensors and devices connected to a control system 300, cleaning of the blades 108 of the wind turbine 100 can occur without the need to take the wind turbine 100 off-line. The control system 300 operates the blades 108 to provide maximum cleaning by the rain, while also maximizing the overall energy capture of the wind turbine 100 over time.

In addition, current electricity prices may be factored in the control system. For example, if a rain event occurs at a time of peak power demand, when the prices of electricity are high, it may be beneficial to postpone the cleaning. Similarly, at a time of low prices, a rain event may trigger cleaning, even if the other parameters do not yet require cleaning.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for cleaning one or more blades of a wind turbine comprising:
    providing the one or more blades rotating about an axis, and having an adjustable rotor speed;
    determining or inferring the presence of precipitation;
    increasing rotor speed in response to the determination of the presence of precipitation;
    providing a control system having input devices communicating therewith;
    after increasing the rotor speed, analyzing input received from the input devices to determine if the rotor speed is to be decreased;
    wherein debris is removed from the one or more blades by the combination of an increased rotor speed and the presence of precipitation.

2. The method for cleaning the one or more blades of a wind turbine as recited in claim 1 comprising:
    the wind turbine having a variable pitch drive to change the pitch of the one or more blades;
    adjusting the variable pitch drive to adjust the pitch of the one or more blades in response to the determination of the presence of precipitation;
    wherein the debris is removed from the one or more blades by the combination of the change in the pitch of the one or more blades and the presence of precipitation.

3. The method for cleaning the one or more blades of a wind turbine as recited in claim 1 comprising:
    upon the determination of precipitation, prior to adjusting the rotor speed, analyzing the input received from the input devices to determine if the rotor speed is to be adjusted.

4. The method for cleaning the one or more blades of a wind turbine as recited in claim 1 comprising:
    providing the control system having information stored therein;
    upon the determination of precipitation, analyzing the stored information to determine if the rotor speed is to be adjusted.

5. The method for cleaning the one or more blades of a wind turbine as recited in claim 1 comprising:
    providing the control system having information stored therein;
    after adjusting the rotor speed, analyzing the stored information to determine if the rotor speed is to be returned to normal.

6. The method for cleaning the one or more blades of a wind turbine as recited in claim 1 comprising:
    after the rotor speed adjustment in response to the determination of the presence of precipitation, determining the absence of precipitation;
    adjusting rotor speed in response to the determination of no the absence of precipitation.

7. The method for cleaning the one or more blades of a wind turbine as recited in claim 1, further comprising inferring the presence of precipitation by monitoring the operation of other components associated with the wind turbine.

8. A method for cleaning one or more blades comprising:
    providing a wind turbine having the one or more blades rotating about an axis, and having a variable pitch drive to control the pitch of the one or more blades;
    determining the presence of precipitation;
    adjusting the pitch of the one or more blades in response to the determination of the presence of precipitation;
    providing a control system having input devices communicating therewith;
    after adjusting the pitch of the one or more blades, analyzing input received from the input devices to determine if the pitch of the one or more blades is to be adjusted;
    wherein the one or more blades are cleaned by the combination of the change in pitch of the one or more blades and the presence of precipitation.

9. The method for cleaning the one or more blades as recited in claim 8 comprising:
    adjusting rotor speed in response to the determination of the presence of precipitation.

10. The method for cleaning the one or more blades as recited in claim 8 comprising:
    upon the determination of precipitation, prior to adjusting the pitch of the one or more blades, analyzing the input received from the input devices to determine if the pitch of the one or more blades is to be adjusted.

11. The method for cleaning the one or more blades as recited in claim 8 comprising:
    providing the control system having information stored therein;
    upon the determination of precipitation, analyzing the stored information to determine if the pitch of the one or more blades is to be adjusted.

12. The method for cleaning the one or more blades as recited in claim 8 comprising:
provide the control system having information stored therein;
after adjusting the pitch of the one or more blades, analyzing the stored information to determine if the pitch of the one or more blades is to be adjusted.

13. The method for cleaning the one or more blades as recited in claim 8 comprising:
after the pitch blade adjustment in response to the determination of the presence of precipitation, determining the absence of precipitation;
adjusting the pitch of the one or more blades in response to the determination of the absence of precipitation.

14. A wind turbine comprising:
one or more blades rotating about a rotor, the wind turbine having an adjustable rotor speed;
at least one sensor configured to detect the presence or absence of precipitation;
a controller configured to increase rotor speed in response to a signal from the at least one sensor corresponding to the presence of precipitation;
at least one input device configured to communicate with the controller, the controller analyzes input received from the input device after the rotor speed is increased to determine if the rotor speed is to be decreased; wherein the debris is removed from the one or more blades by the combination of an increased rotor speed and the presence of precipitation.

15. The wind turbine as recited in claim 14 wherein the controller is configured to adjust pitch of the one or more blades in response to a signal from the at least one sensor corresponding to the presence or absence of precipitation.

16. The wind turbine as recited in claim 14 wherein the at least one sensor configured to detect the presence or absence of precipitation is mounted on the wind turbine.

17. The wind turbine as recited in claim 14 wherein the at least one sensor configured to detect the presence or absence of precipitation is remote from the wind turbine.

18. The wind turbine as recited in claim 14 wherein the controller has a control system which receives input from the at least one sensor configured to detect the presence or absence of precipitation and other sensors which detect other environmental conditions, the controller configured to adjust rotor speed in response to the signal from at least one sensor corresponding to the presence or absence of precipitation and signals from the other sensors corresponding to the other environmental conditions.

* * * * *